United States Patent
Dai et al.

(10) Patent No.: US 9,436,192 B2
(45) Date of Patent: Sep. 6, 2016

(54) APPARATUS FOR PWM GATE DRIVE CIRCUIT

(71) Applicant: FutureWei Technologies, Inc., Plano, TX (US)

(72) Inventors: Heping Dai, Plano, TX (US); Hengchun Mao, Plano, TX (US); Zhihua Liu, Shenzhen (CN); Zhaozheng Hou, Shenzhen (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 332 days.

(21) Appl. No.: 13/957,080

(22) Filed: Aug. 1, 2013

(65) Prior Publication Data

US 2014/0035552 A1    Feb. 6, 2014

Related U.S. Application Data

(60) Provisional application No. 61/678,443, filed on Aug. 1, 2012.

(51) Int. Cl.
*G05F 1/46*      (2006.01)
*H02M 3/158*   (2006.01)

(52) U.S. Cl.
CPC .............. *G05F 1/46* (2013.01); *H02M 3/1588* (2013.01); *Y02B 70/1425* (2013.01); *Y02B 70/1466* (2013.01)

(58) Field of Classification Search
CPC .. H02M 3/158; H02M 3/156; H02M 3/1588; H02M 2001/0009; H02M 2001/0025; G05F 1/46; Y02B 70/1425; Y02B 70/1466
USPC ......................................... 323/282, 283, 311
See application file for complete search history.

(56) References Cited

U.S. PATENT DOCUMENTS

| | | | |
|---|---|---|---|
| 7,876,080 B2 * | 1/2011 | Dwarakanath et al. ....... | 323/284 |
| 8,305,067 B2 * | 11/2012 | Cheung et al. ............... | 323/285 |
| 2009/0231887 A1 * | 9/2009 | Ye et al. ..................... | 363/21.02 |
| 2012/0069606 A1 * | 3/2012 | Sagneri et al. ............ | 363/21.02 |
| 2013/0063114 A1 * | 3/2013 | Agrawal et al. .............. | 323/283 |

\* cited by examiner

*Primary Examiner* — Timothy J Dole
*Assistant Examiner* — Htet Z Kyaw
(74) *Attorney, Agent, or Firm* — Slater Matsil, LLP

(57) ABSTRACT

A converter comprises a high side switch, a low side switch connected in series with the high switch, a gate drive circuit comprising a first drive port coupled to a gate of the high side switch, a second drive port coupled to a gate of the low side switch, an SRE input port and a PWM input port coupled to a PWM controller, wherein the PWM controller is selected from the group consisting of a first PWM controller having two complementary PWM outputs, a second PWM controller having a tri-state PWM output and a third PWM controller having a single PWM output.

20 Claims, 4 Drawing Sheets

| OPERATION MODE | DRIVER INPUTS | | OUTPUTS: TRANSISTOR GATE SIGNALS | |
|---|---|---|---|---|
| | INPUT 1 | INPUT 2 | MAIN TRANSISTOR | SYNCHRONOUS TRANSISTOR |
| SHUTDOWN 1 | CONTINUOUS HI-Z OR TRI-STATE | ANY LOGIC STATE | POWER MODULE SHUTDOWN | POWER MODULE SHUTDOWN |
| SHUTDOWN 2 | CONTINUOUS LOGIC LOW | ANY LOGIC STATE | POWER MODULE SHUTDOWN | POWER MODULE SHUTDOWN |
| DIODE 1 | CONTINUOUS HI-Z OR TRI-STATE | LOGIC HIGH, LOW, OR PULSES | SAME AS INPUT 2 | LOGIC LOW |
| DIODE 2 | CONTINUOUS LOGIC LOW | LOGIC HIGH, LOW, OR PULSES | SAME AS INPUT 2 | LOGIC LOW |
| PRE-BIAS 1 | CONTINUOUS HI-Z OR TRI-STATE | LOGIC HIGH, LOW, OR PULSES | SAME AS INPUT 2 | LOGIC LOW |
| PRE-BIAS 2 | CONTINUOUS LOGIC LOW | LOGIC HIGH, LOW, OR PULSES | SAME AS INPUT 2 | LOGIC LOW |
| SINGLE PWM CONTROL 1 | CONTINUOUS HI-Z OR TRI-STATE | LOGIC HIGH | LOGIC HIGH | LOGIC LOW |
| | | LOGIC LOW | LOGIC LOW | LOGIC HIGH |
| | | HI-Z OR TRI-STATE | LOGIC LOW | LOGIC LOW |
| SINGLE PWM CONTROL 2 | CONTINUOUS LOGIC HIGH | LOGIC HIGH | LOGIC HIGH | LOGIC LOW |
| | | LOGIC LOW | LOGIC LOW | LOGIC HIGH |
| | | HI-Z OR TRI-STATE | LOGIC LOW | LOGIC LOW |
| DUAL PWM CONTROL 1 | PULSES 1 | PULSES 2 | PWM PULSES 2 | PULSES 1 |
| DUAL PWM CONTROL 2 | PULSES 1 | PULSES 2 | PWM PULSES 2 | COMPLEMENTARY TO PULSES 2 |

FIG. 8

APPARATUS FOR PWM GATE DRIVE CIRCUIT

CROSS REFERENCE TO RELATED APPLICATIONS

This application is related to, and claims priority to U.S. Provisional Application No. 61/678,443, titled, "Apparatus for PWM Gate Drive Circuit" filed on Aug. 1, 2012, which is herein incorporated by reference.

TECHNICAL FIELD

The present invention relates to power converters, and, in particular embodiments, to direct current to direct current (dc/dc) step-down voltage converters, which are commonly referred to as buck converters.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. The DC-DC stage may comprise isolated DC-DC converters. Isolated DC-DC converters can be implemented by using different power topologies, such as flyback converters, forward converters, half bridge converters, full bridge converters and the like. The outputs of the isolated DC-DC stage may function as intermediate power buses (e.g., 12V intermediate power bus) for the telecommunication network power system.

The intermediate power buses may have a relatively wide voltage range. For example, an intermediate power bus may be specified to be 12V. The intermediate power bus may have a range from 9V to 15V in consideration with input voltage fluctuations. A plurality of downstream non-isolated dc/dc converters may be coupled to the intermediate power bus. The downstream non-isolated dc/dc converters may generate a variety of voltage levels in accordance with the needs of the telecommunication network power system.

The non-isolated dc-dc converters can be implemented by using different power topologies, such as buck dc-dc converters, boost dc-dc converters, buck-boost dc-dc converters, linear regulators and/or the like.

SUMMARY OF THE INVENTION

These and other problems are generally solved or circumvented, and technical advantages are generally achieved, by preferred embodiments of the present invention which provides a gate drive circuit suitable for a variety of PWM controller.

In accordance with an embodiment, a converter comprises a high side switch, a low side switch connected in series with the high switch, a gate drive circuit comprising a first drive port coupled to a gate of the high side switch, a second drive port coupled to a gate of the low side switch, an SRE input port and a PWM input port coupled to a PWM controller, wherein the PWM controller is selected from the group consisting of a first PWM controller having two complementary PWM outputs, a second PWM controller having a tri-state PWM output and a third PWM controller having a single PWM output.

In accordance with another embodiment, an apparatus comprises a first gate drive port configured to generate a first gate drive signal, a second gate drive port configured to generate a second gate drive signal, wherein the second gate drive signal and the first gate drive signal are complementary during normal operation, an SRE input port and a PWM input port coupled to a PWM controller, wherein the PWM controller is selected from the group consisting of a first PWM controller having two complementary PWM outputs, a second PWM controller having a tri-state PWM output and a third PWM controller having a single PWM output.

In accordance with yet another embodiment, a method comprises detecting a first signal at a PWM port and a second signal at an SRE port of a gate drive circuit, wherein the gate drive circuit is coupled to a PWM controller, wherein the PWM controller is selected from the group consisting of a first PWM controller having two complementary PWM outputs, a second PWM controller having a tri-state PWM output and a third PWM controller having a single PWM output, determining an operation mode of the gate drive circuit based upon the first signal and the second signal and generating a first gate drive signal at a first gate drive port and a second gate drive signal at a second gate drive port based upon the first signal the second signal, wherein the first gate drive signal and the second gate drive signal are complementary signals.

An advantage of a preferred embodiment of the present invention is applying a gate drive circuit to a variety of PWM controllers. As a result, the cost of manufacturing power converters having different types of PWM controllers may be reduced.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 8 illustrates a variety of features incorporated in the gate drive circuit in accordance with various embodiments of the present disclosure.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a gate drive circuit for step-down dc/dc converters. The invention may also be applied, however, to a variety of power converters including isolated power converters such as full-bridge converters, half-bridge converters, forward converters, flyback converters and/or the like, non-isolated power converters such as buck converters, boost converters, buck-boost converters and/or the like, resonant converters, any combinations thereof and/or the like. Hereinafter, various embodiments will be explained in detail with reference to the accompanying drawings.

Figure 1:
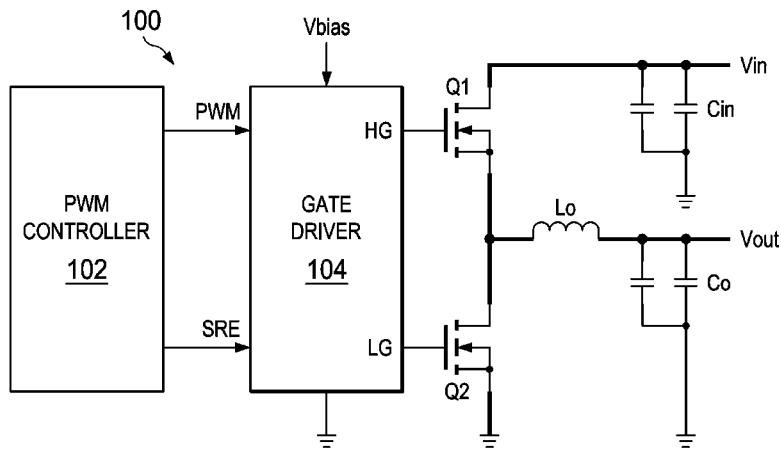
FIG. 1 illustrates a schematic diagram of a step-down dc/dc converter in accordance with various embodiments of the present disclosure.

FIG. 1 illustrates a schematic diagram of a step-down dc/dc converter in accordance with various embodiments of the present disclosure. As shown in FIG. 1, the step-down dc/dc converter 100 comprises a high side switch Q1 and a low side switch Q2. The high side switch Q1 and the low side switch Q2 are connected in series between an input power source Vin and ground. In order to attenuate noise and sustain the input voltage, a plurality of input capacitors Cin are coupled between the input power source Vin and ground.

The common node between the high side switch Q1 and the low side switch Q2 is commonly referred to as a phase node of the step-down dc/dc converter 100. As shown in FIG. 1, there may be an output L-C filter coupled between the phase node and the output terminal Vout. In particular, the output L-C filter is formed by an output inductor Lo and a plurality of output capacitors Co.

According to the operating principle of step-down dc/dc converters, the high side switch Q1 and the low side switch Q2 may operate in a complementary mode during normal operation. The on/off of the high side switch Q1 and the low side switch Q2 are controlled by a PWM controller 102 through a gate drive circuit 104. As shown in FIG. 1, the gate drive circuit 104 receives two control signals from the PWM controller 102 at two input ports, namely PWM and SRE respectively. Since the control signals are fed into the PWM port and the SRE port of the gate drive circuit 104, these two control signals may be alternatively referred to as control signal PWM and control signal SRE respectively throughout the description.

In some embodiments, in response to the controller signals PWM and SRE, the gate drive circuit 104 may generate two gate drive signals, which are complementary gate drive signals. In addition, these two gate drive signals are coupled to the gates of the high side switch Q1 and the low side switch Q2 respectively.

It should be noted that the gate drive circuit 104 shown in FIG. 1 is capable of generating complementary gate drive signals in response to control signals sent by different types of PWM controllers. In accordance with some embodiments, the PWM port of the gate drive circuit 104 is able to accept PWM pulses, logic low/high signals and tri-state signals. The SRE port of the gate drive circuit 104 is able to at least accept PWM pulses and logic low/high signals. The detailed operating mechanisms of the gate drive circuit will be described below with respect to FIGS. 2 to 8.

It should further be noted the schematic diagram shown in FIG. 1 is merely an example, which should not unduly limit the scope of the claims. One of ordinary skill in the art would recognize many variations, alternatives, and modifications. For example, one skilled in the art will recognize that the step-down dc/dc converter is simply one suitable non-isolated power conversion circuit and that other and alternate embodiment converters could be employed (such as employing other non-isolated power converters including boost dc/dc converter, buck-boost dc/dc converter and/or the like) and that other isolated power circuits, (e.g., full-bridge converters, half-bridge converters, forward converters, flyback converters and/or the like) could be employed. Furthermore, the gate drive circuit described in the present disclosure may be applicable to resonant converters and/or the like.

Figure 2:
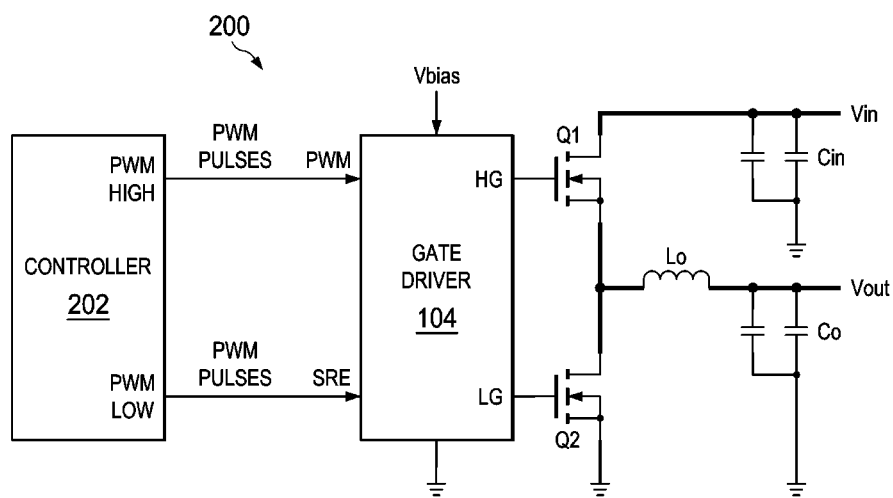
FIG. 2 illustrates a schematic diagram of a first illustrative embodiment of the step-down dc/dc converter shown in FIG. 1 in accordance with various embodiments of the present disclosure.

FIG. 2 illustrates a schematic diagram of a first illustrative embodiment of the step-down dc/dc converter shown in FIG. 1 in accordance with various embodiments of the present disclosure. The step-down dc/dc converter 200 comprises a PWM controller 202 and the gate drive circuit 104. The gate drive circuit 104 is coupled to the PWM controller 202. As shown in FIG. 2, the PWM controller 202 generates two complementary gate control signals PWM High and PWM Low respectively. These two complementary gate control signals PWM High and PWM Low are fed into the input port PWM and the input port SRE of the gate drive circuit 104 respectively.

The gate drive circuit 104 is capable of detecting the complementary gate drive signals PWM High and PWM Low sent from the PWM controller 202. Furthermore, the gate drive circuit 104 is able to generate two complementary gate drive signals, which are coupled to the gates of the high side switch Q1 and the low side switch Q2 respectively. The detailed timing diagram will be described below with respect to FIG. 3.

It should be noted while the high side gate drive signal HG and the low side gate drive signal LG are two complementary gate drive signals, one skilled in the art will recognize that in a switching cycle, there may be a dead time between the high side gate drive signal HG and the low side signal LG. It should further be noted that during an abnormal operation mode such as a startup process, the high side gate drive HG and the low side gate drive LG are not complementary in order to achieve a monotonic startup (e.g., a pre-bias start up process). The gate drive circuit 104 is capable of incorporating these kinds of common features of power converters (e.g., the step-down dc/dc converter 200 shown in FIG. 2).

Figure 3:
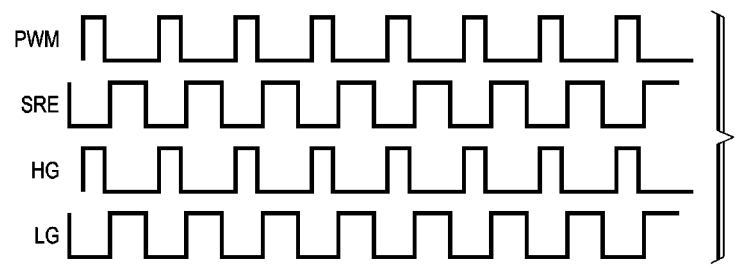
FIG. 3 illustrates the control signals of the step-down dc/dc converter shown in FIG. 2 in accordance with various embodiments of the present disclosure.

FIG. 3 illustrates the control signals of the step-down dc/dc converter shown in FIG. 2 in accordance with various embodiments of the present disclosure. Referring back to FIG. 2, the input ports PWM and SRE of the gate drive circuit 104 are coupled to the outputs PWM High and PWM Low of the PWM controller 202 respectively. The control signal at the input port PWM is complementary to the control signal at the input port SRE. There may be at least one dead time between the control signal at the input port PWM and the control signal at the input port SRE during one switching cycle.

As shown in FIG. 3, in response to the control signals received at ports PWM and SRE, the gate drive circuit 104 may generate two gate drive signals HG and LG respectively. The gate drive signal HG is in phase with the control signal PWM. It should be noted that there may be a propagation delay between the control signal PWM and the gate drive signal HG. On the other hand, the gate drive signal of LG is in phase with the control signal SRE. Likewise, there may be a propagation delay between the control signal SRE and the gate drive signal LG. In short, the gate drive circuit 104 is capable of generating two complementary gate drive signals after receiving two complementary control signals (e.g., complementary PWM pulses) at ports PWM and SRE respectively.

Figure 4:
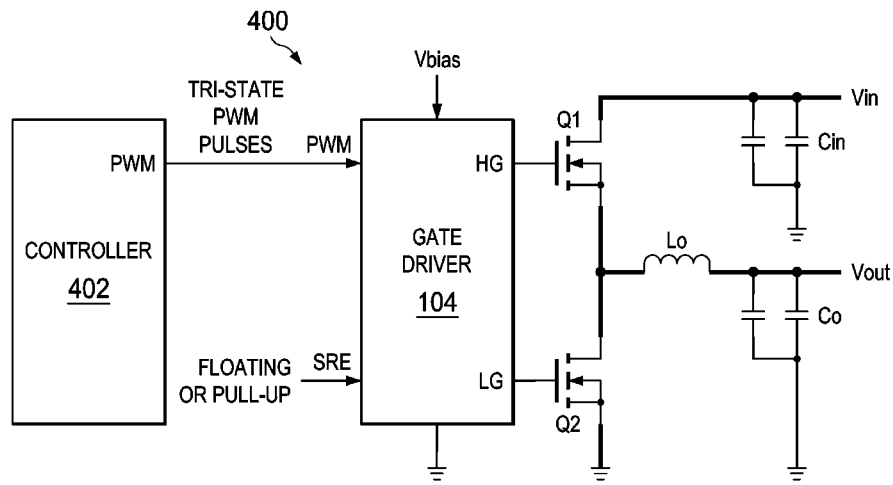
FIG. 4 illustrates a schematic diagram of a second illustrative embodiment of the step-down dc/dc converter shown in FIG. 1 in accordance with various embodiments of the present disclosure.

FIG. 4 illustrates a schematic diagram of a second illustrative embodiment of the step-down dc/dc converter shown in FIG. 1 in accordance with various embodiments of the present disclosure. The step-down dc/dc converter 400 comprises a PWM controller 402 and the gate drive circuit 104. The gate drive circuit 104 is coupled to the PWM controller 402. As shown in FIG. 4, the PWM controller 402 generates a tri-state PWM signal. The PWM port of the gate drive circuit 104 receives the tri-state PWM signal.

In some embodiments, the SRE port of the gate drive circuit 104 may be floating if the SRE port is internally pulled up. In alternative embodiments, the SRE port of the gate drive circuit 104 may be pulled up to a logic high state. Furthermore, the SRE port of the gate drive circuit 104 may function as an enable/disable pin in accordance with various embodiments of the present disclosure.

In response to the tri-state PWM signal coupled to the PWM port, the gate drive circuit 104 is able to generate two gate drive signals, which are complementary when the tri-state PWM signal is either in a logic high state or a logic low state. On the other hand, the gate drive circuit 104 may turn off both the high side switch Q1 and the low side switch Q2 when the tri-stage PWM signal is in tri-state. The detailed timing diagram will be described below with respect to FIG. 5.

Figure 5:
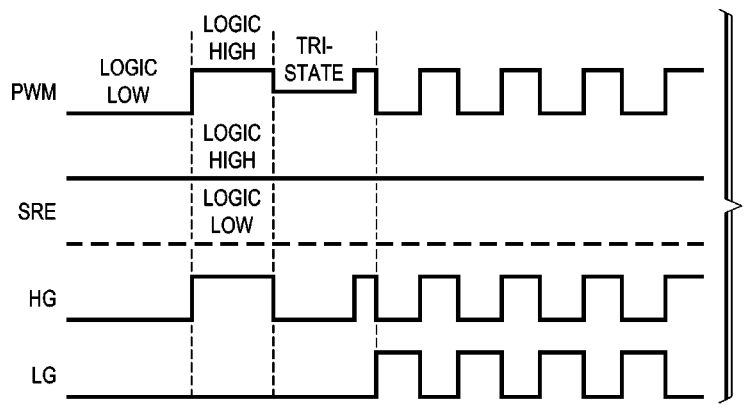
FIG. 5 illustrates the control signals of the step-down dc/dc converter shown in FIG. 4 in accordance with various embodiments of the present disclosure.

It should be noted while the high side gate drive signal HG and the low side gate drive signal LG shown in FIG. 5 are two complementary gate drive signals, one skilled in the art will recognize that in a switching cycle, there may be a dead time between the high side gate drive signal HG and the low side signal LG. It should further be noted that during an abnormal operation mode such as a startup process, the high side gate drive HG and the low side gate drive LG are not complementary in order to achieve a monotonic startup.

FIG. 5 illustrates the control signals of the step-down dc/dc converter shown in FIG. 4 in accordance with various embodiments of the present disclosure. Referring back to FIG. 4, the PWM port of the gate drive circuit 104 accepts a tri-state PWM signal (a.k.a. a three-level signal). After detecting a three-level input signal at the PWM port, the gate drive circuit 104 is able to generate the high side gate drive signal HG and the low side gate drive signal LG based upon the three-level input signal at the PWM port.

As shown in FIG. 5, in response to the three-level input signal, the gate drive circuit 104 may generate two gate drive signals HG and LG respectively. The gate drive signal HG is in phase with the control signal PWM unless the control signal PWM is in tri-state. The gate drive signal of LG is complementary to the high side gate drive signal HG unless the control signal PWM is in tri-state.

As shown in FIG. 5, when the control signal PWM is in tri-state, both the high side gate drive HG and the low side gate drive LG are held at a logic low level. As a result, the step-down converter enters a diode emulation mode.

Figure 6:
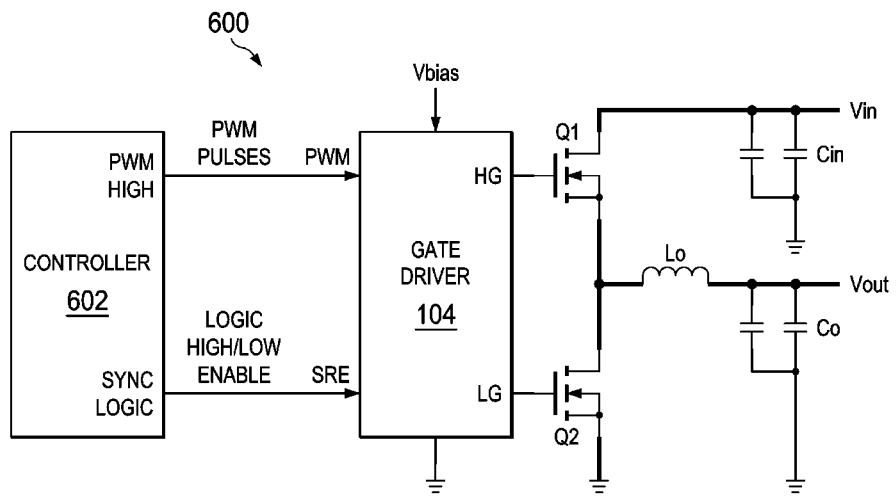
FIG. 6 illustrates a schematic diagram of a third illustrative embodiment of the step-down dc/dc converter shown in FIG. 1 in accordance with various embodiments of the present disclosure.

FIG. 6 illustrates a schematic diagram of a third illustrative embodiment of the step-down dc/dc converter shown in FIG. 1 in accordance with various embodiments of the present disclosure. The step-down dc/dc converter 600 comprises a PWM controller 602 and the gate drive circuit 104. The gate drive circuit 104 is coupled to the PWM controller 602. As shown in FIG. 6, the PWM controller 602 generates a PWM signal and an enable/disable signal, which are coupled to the PWM port and the SRE port of the gate drive circuit 104 respectively.

In response to the PWM signal coupled to the PWM port, the gate drive circuit 104 is able to internally generate two gate drive signals, which are complementary when the enable pin is in a logic high state. On the other hand, the SRE port functions as an enable/disable pin. When the enable/disable pin is in a logic low state, the gate drive circuit 104 may turn off both the high side switch Q1 and the low side switch Q2. In alternative embodiments, when the enable pin is in a logic low state, the gate drive circuit 104 may only disable the low side switch Q2. The gate drive signal of the high side switch Q1 is in phase with the PWM signal. The detailed timing diagram will be described below with respect to FIG. 7.

It should be noted while the high side gate drive signal HG and the low side gate drive signal LG are two complementary gate drive signals, one skilled in the art will recognize that in a switching cycle, there may be a dead time between the high side gate drive signal HG and the low side signal LG. It should further be noted that during an abnormal operation mode such as a startup process, the high side gate drive HG and the low side gate drive LG are not complementary in order to achieve a monotonic startup.

Figure 7:
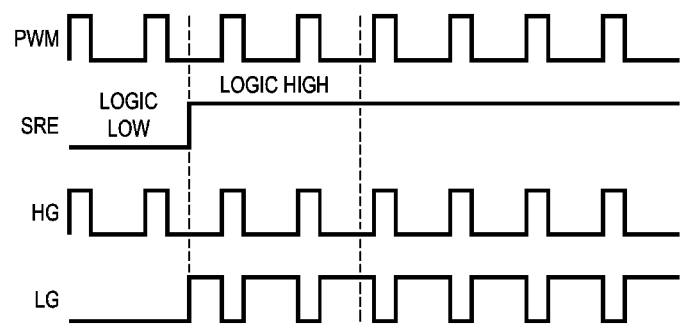
FIG. 7 illustrates the control signals of the step-down dc/dc converter shown in FIG. 6 in accordance with various embodiments of the present disclosure.

FIG. 7 illustrates the control signals of the step-down dc/dc converter shown in FIG. 6 in accordance with various embodiments of the present disclosure. Referring back to FIG. 6, the PWM port accepts the PWM signal. After detecting a two-level PWM signal at the PWM port and a logic high state at the SRE port, the gate drive circuit 104 is able to generate the high side gate drive signal HG and the low side gate drive signal LG based upon the two-level input signal at the PWM port.

As shown in FIG. 7, in response to the PWM signal, the gate drive circuit 104 may generate two gate drive signals HG and LG respectively. The gate drive signal HG is in phase with the control signal PWM. The gate drive signal of LG is complementary to the high side gate drive signal HG unless the SRE signal is in a logic low state.

As shown in FIG. 7, when the SRE signal is in a logic low state, the low side gate drive LG is held at a logic low level. As a result, the body diode of the low side switch Q2 may be activated.

FIG. 8 illustrates a variety of features that may be included in the gate drive circuit 104 in accordance with various embodiments of the present disclosure. As shown in FIG. 8, a variety of operation modes are illustrated in the first column of the table. The operation modes include Shutdown 1, Shutdown 2, Diode 1, Diode 2, Pre-bias 1, Pre-bias 2, Single PWM control 1, Single PWM control 2, Dual PWM 1 and Dual PWM control 2. The definition of each operation mode is illustrated in columns 2-5 of the table. In particular, the second column and the third column include the information of the input signals coupled to the input ports of the gate drive circuit 104. In some embodiments, Input 2 is the PWM port of the gate drive circuit 104 and Input 1 is the SRE port of the gate drive circuit 104.

As shown in FIG. 8, the input signals at the SRE port include a continuous high impedance (hi-z) signal, a tri-state signal, a continuous logic low, a continuous logic high, a PWM pulse, any combinations thereof and/or the like.

Likewise, the input signals of the PWM port include any logic state signals, a logic high signal, a logic low signal, a high impedance signal, a tri-stage signal, a PWM pulse, any combinations thereof and/or the like.

The fourth column and the fifth column include the corresponding output signals of the gate drive circuit 104. In some embodiment, the main transistor is Q1 shown in FIG. 1. The synchronous transistor is Q2 shown in FIG. 1. As shown in FIG. 8, the gate signals fed to the main transistor include a turn-off signal (e.g., power module shutdown as shown in FIG. 8), a signal similar to the signal at Input 2, a logic high signal, a logic low signal, a PWM pulse, any combinations thereof and/or the like.

Likewise, the gate signals fed to the synchronous transistor include a turn-off signal (e.g., power module shutdown as shown in FIG. 8), a signal similar to the signal at Input 1, signal complementary to the signal at Input 2, a logic high signal, a logic low signal, a PWM pulse, any combinations thereof and/or the like.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A converter comprising:
 a high side switch;
 a low side switch connected in series with the high side switch;
 a gate drive circuit comprising:
  a first drive port coupled to a gate of the high side switch;
  a second drive port coupled to a gate of the low side switch;
  a control input port; and
  a PWM input port having an input interface suitable for a first PWM controller having two complementary PWM outputs, a second PWM controller having a single PWM output generating a tri-state PWM fed into the PWM input port and a third PWM controller having a single PWM output fed into the PWM input port and a control logic output fed into the control input port.

2. The converter of claim 1, wherein:
 the first drive port is configured to generate a first gate signal in phase with a first PWM signal from the first PWM controller; and
 the second drive port is configured to generate a second gate signal in phase with a second PWM signal from the first PWM controller, wherein the first PWM signal and the second PWM signal are two complementary control signals.

3. The converter of claim 1, wherein:
 the first drive port is configured to generate a first gate signal in phase with a first PWM signal from the second PWM controller; and
 the second drive port is configured to generate a second gate signal complementary to the first gate signal.

4. The converter of claim 3, wherein:
 when the first PWM signal is in tri-state, both the first drive port and the second drive port are configured to generate a logic low state.

5. The converter of claim 1, wherein:
 in response to a logic high state at the control input port, the first drive port is configured to generate a first gate signal in phase with a first PWM signal from the third PWM controller; and
 the second drive port is configured to generate a second gate signal complementary to the first gate signal.

6. The converter of claim 1, wherein:
 in response to a logic low state at the control input port, the first drive port is configured to generate a first gate signal in phase with a first PWM signal from the third PWM controller; and
 the second drive port is configured to generate a logic low signal.

7. The converter of claim 1, wherein:
 the converter is a step-down dc/dc converter comprising:
  a plurality of input capacitors coupled between an input of the converter and ground;
  the high side switch connected in series with the low side switch, wherein the high side switch is coupled to input capacitors and the low side switch is coupled to ground; and
  an output filter coupled to a common node of the high side switch and the low side switch.

8. The converter of claim 7, wherein:
 the output filter comprises an output inductor and a plurality of output capacitors.

9. An apparatus comprising:
 a first gate drive port configured to generate a first gate drive signal;
 a second gate drive port configured to generate a second gate drive signal, wherein the second gate drive signal and the first gate drive signal are complementary during normal operation;
 a control input port; and
 a PWM input port having an input interface suitable for a first PWM controller having two complementary PWM outputs connected to the PWM input port and the control input port respectively, a second PWM controller having a single tri-state PWM output connected to the PWM input port and a third PWM controller having a single PWM output and a logic output connected to the PWM input port and the control input port respectively.

10. The apparatus of claim 9, further comprising:
a first switch having a gate coupled to the first gate drive port; and
a second switch have a gate coupled to the second gate drive port.

11. The apparatus of claim 10, wherein:
the first switch and the second switch are connected in series.

12. The apparatus of claim 11, wherein:
the first switch is a main switch of a step-down dc/dc converter; and
the second switch is a synchronous switch of the step-down dc/dc converter.

13. The apparatus of claim 9, wherein:
the PWM input port is configured to receive a plurality of first PWM pulses;
the control input port is configured to receive a plurality of second PWM pulses, wherein the second PWM pulses are complementary to the first PWM pulses;
the first gate drive port is configured to generate the first gate drive signal in phase with the first PWM pulses; and
the second gate drive port is configured to generate the second gate drive signal in phase with the second PWM pulses.

14. The apparatus of claim 9, wherein:
the PWM input port is configured to receive a tri-state signal and a PWM signal.

15. The apparatus of claim 14, wherein:
the first gate drive port is configured to generate the first gate drive signal in phase with the PWM signal when the PWM input port is configured to receive the PWM signal; and
the second gate drive port is configured to generate the second gate drive signal complementary to the first gate drive signal when the PWM input port is configured to receive the PWM signal.

16. The apparatus of claim 14, wherein:
the first gate drive port is configured to generate a logic low signal when the PWM input port is configured to receive the tri-state signal; and
the second gate drive port is configured to generate the logic low signal when the PWM input port is configured to receive the tri-state signal.

17. A method comprising:
detecting a first signal at a PWM port and a second signal at a control port of a gate drive circuit, wherein the gate drive circuit includes an input interface suitable for a first PWM controller having two complementary PWM outputs connected to the PWM port and the control port respectively, a second PWM controller having a tri-state PWM output connected to the PWM port and a third PWM controller having a single PWM output and a logic output connected to the PWM port and the control port respectively;
determining an operation mode of the gate drive circuit based upon the first signal and the second signal; and
generating a first gate drive signal at a first gate drive port and a second gate drive signal at a second gate drive port based upon the first signal the second signal, wherein the first gate drive signal and the second gate drive signal are complementary signals.

18. The method of claim 17, further comprising:
detecting a plurality of first PWM pulses at the PWM port and a plurality of second PWM pulses at the control port, wherein the second PWM pulses are complementary to the first PWM pulses;
generating the first gate drive signal in phase with the first PWM pulses; and
generating the second gate drive signal in phase with the second PWM pulses.

19. The method of claim 17, further comprising:
detecting a tri-state signal at the PWM port;
generating a first logic low signal at the first gate drive port; and
generating a second logic low signal at the second gate drive port.

20. The method of claim 19, further comprising:
in response to a control signal transition from the tri-state signal to a PWM signal, generating the first gate drive signal in phase with the PWM signal; and
generating the second gate drive signal complementary to the first gate drive signal.

* * * * *